(12) United States Patent
Kim et al.

(10) Patent No.: US 8,817,770 B2
(45) Date of Patent: Aug. 26, 2014

(54) TDM BASED CELL SEARCH METHOD FOR OFDM SYSTEM

(75) Inventors: Il-Gyu Kim, Seoul (KR); Hyeong-Geun Park, Daejeon (KR); Young-Jo Ko, Daejeon (KR); Kapseok Chang, Daejeon (KR); Hyoseok Yi, Daejeon (KR); Jun-Hwan Lee, Seoul (KR); Young-Hoon Kim, Daejeon (KR); Seung-Chan Bang, Daejon (KR)

(73) Assignees: Electronics and Telecommunications Research Institute, Daejeon (KR); Samsung Electronics Co., Ltd., Suwon-si (KR)

( * ) Notice: Subject to any disclaimer, the term of this patent is extended or adjusted under 35 U.S.C. 154(b) by 730 days.

(21) Appl. No.: 12/425,813

(22) Filed: Apr. 17, 2009

(65) Prior Publication Data

US 2009/0196279 A1 Aug. 6, 2009

Related U.S. Application Data

(63) Continuation of application No. PCT/KR2007/005113, filed on Oct. 18, 2007.

(30) Foreign Application Priority Data

Oct. 18, 2006 (KR) .................. 10-2006-0101512
Feb. 1, 2007 (KR) .................. 10-2007-0010610
Oct. 18, 2007 (KR) .................. 10-2007-0105209

(51) Int. Cl.
*H04J 3/06* (2006.01)
*H04J 11/00* (2006.01)
*H04L 27/26* (2006.01)

(52) U.S. Cl.
CPC ......... *H04J 11/0069* (2013.01); *H04L 27/2675* (2013.01); *H04L 27/2613* (2013.01)
USPC ........................................ 370/350

(58) Field of Classification Search
CPC ............. H04J 11/0069; H04L 27/2675; H04L 27/2613
USPC ........................................ 370/350
See application file for complete search history.

(56) References Cited

U.S. PATENT DOCUMENTS 7,346,138 B2 * 3/2008 Fazel et al. ............... 375/354
7,876,731 B2   1/2011 Jang et al.

(Continued)

FOREIGN PATENT DOCUMENTS

CN  1264228  8/2000
CN  1433173  7/2003

(Continued)

OTHER PUBLICATIONS

3GPP TSG RAN WSG1 # 47-bis, Qualcomm Europe: Future Analysis of Initial Cell Search for Approach 1 and 2—Single Cell Scenario; R1-070428, Jan. 15-19, 2007.*

(Continued)

*Primary Examiner* — Asad Nawaz
*Assistant Examiner* — Saad A Waqas
(74) *Attorney, Agent, or Firm* — Nelson Mullins Riley & Scarborough LLP

(57) ABSTRACT

Provided are a sync channel of a forward link, a common pilot channel structure, and an initial cell search method and an adjacent cell search method for handover in a cellular system using orthogonal frequency division multiplexing (OFDM). A cell search method in an OFDM cellular system in which a primary sync channel and a secondary sync channel are configured based on time division multiplexing (TDM) includes acquiring sync block synchronization and a primary sync channel sequence number using a primary sync channel symbol included in a frame received by a terminal, detecting a boundary of the frame and a scrambling code group using the sync block and a secondary sync channel symbol included in the frame received by the terminal, and acquiring a scrambling code using the primary sync channel sequence number and the scrambling code group, thereby reducing cell search time with low complexity.

20 Claims, 11 Drawing Sheets

(56) References Cited

U.S. PATENT DOCUMENTS

| | | | |
|---|---|---|---|
| 2003/0174767 A1* | 9/2003 | Fujii et al. | 375/229 |
| 2005/0157637 A1 | 7/2005 | Feng et al. | |
| 2008/0089282 A1* | 4/2008 | Malladi et al. | 370/329 |
| 2010/0166089 A1* | 7/2010 | Seki | 375/260 |
| 2011/0268104 A1* | 11/2011 | Akita et al. | 370/350 |

FOREIGN PATENT DOCUMENTS

| | | |
|---|---|---|
| CN | 1832362 | 9/2006 |
| KR | 1020060015188 | 2/2006 |
| WO | WO-2008/048060 A1 | 4/2008 |

OTHER PUBLICATIONS

3GPP TSG RAN WSG1 #46-bis, "Nokia et al.: Outcome of Cell Search Drafting Session", R1-062990, Oct. 9-13, 2006.*

Nokia et al., "Outcome of cell search drafting session", TSG RAN WG1 #46bis, R1-062990, Seoul, Korea, Oct. 9-13, 2006.*

ETSI, "Universal Mobile Telecommunications System (UMTS); Physical channels and mapping of transport channels onto physical channels (FDD) (3GPP TS 25.211 version 7.0.0 Release 7)," ETSI TS 125 211 V7.0.0 (2006).

ETSI, "Universal Mobile Telecommunications System (UMTS); Physical layer procedures (FDD) (3GPP TS 25.214 version 7.2.0 Release 7)," ETSI TS 125 214 V7.2.0 (2006).

3GPP, "3rd Generation Partnership Project; Technical Specification Group Radio Access Network; Physical layer aspects for evolved Universal Terrestrial Radio Access (UTRA) (Release 7)," 3GPP TR 25.814 V7.1.0 (2006.

NTT DoCoMo, Fujitsu, Mitsubishi Electric, NEC, Panasonic, Toshiba Corporation, "Cell Search Time Performance of Three-Step Cell Search Method in Multi-Cell Environment," 3GPP TSG RAN WG1 Meeting #46, R1-062096 (2006).

Qualcomm Europe, "SCH structure for E-UTRA," 3GPP TSG-RAN WG1 #46, R1-062037 (2006).

ETRI, "Cell Search Approach 1: Further Consideration," 3GPP TSG RAN1 WG1 #47, R1-063520, 6 pages (2006).

Huawei, "Cell search times of hierarchical and non-hierarchical SCH signals," 3GPP TSG RAN WG1#45, R1-061248, 5 pages, (2006).

Motorola, "S-SCH Sequence Design," 3GPP TSG RAN WG1 #47. R1-063050, 5 pages, (2006).

Motorola, "SCH Design for Non-initial Cell Search," 3GPP TSG RAN1 #bis, R1-062607, 4 pages, (2006).

Wenbin, Li, "Detailed Explanations on the Procedure of WCDMA Terminal Cell Search," Communication and Information Technology, 157th Issue, pp. 6-9 (2005).

ETRI, "Non-initial cell search perfromance comparison of FDM based and TDM based schemes," 3GPP TSG RAN1, R1-062582, 10 pages, (2006).

LG Electronics, "SCH Structure and Sequences for Cell Search," 3GPP TSG RAN WG1 #46bis, R1-062560, 13 pages, (2006).

NTT DoCoMo et al., "Multiplexing Method of SCH for E-UTRA Downlink," 3GPP TSG RAN WG1 Meeting #46bis, R1-062721, 9 pages, (2006).

NTT DoCoMo et al., "SCH Structure and Cell Search Method fo rE-UTRA Downlink," 3GPP TSG RAN WG1 LTE Ad Hoc, R1-061662, 11 pages, (2006).

Texas Instruments, "Proposal for DL SYNC Channel (SCH) for E-UTRA Cell Search," 3GPP TSG RAN WG1 46bis, R1-062635, 6 pages, (2006).

* cited by examiner

US 8,817,770 B2

TDM BASED CELL SEARCH METHOD FOR OFDM SYSTEM

RELATED APPLICATIONS

This application is a continuation of International Application No. PCT/KR2007/005113, filed on Oct. 18, 2007, which claims priority to, and benefit of, Korean Patent Application No. 10-2006-0101512, filed on Oct. 18, 2006, Korean Patent Application No. 10-2007-0010610, filed on Feb. 1, 2007, and Korean Patent Application No. 10-2007-0105209, filed on Oct. 18, 2007. The contents of the aforementioned applications are hereby incorporated by reference.

TECHNICAL FIELD

The present invention relates to an orthogonal frequency division multiplexing (OFDM) cellular system, and more particularly, to a method of searching for an initial cell and an adjacent cell in an OFDM cellular system, and a mobile station using the method, a base station using the method, a system using the method, and a frame structure used in the method.

This work was supported by the IT R&D program of MIC/ IITA [2005-S-404-12, Research & Development of Radio Transmission Technology for 3G evolution]

BACKGROUND ART

In wideband code division multiple access (WCDMA) of the $3^{rd}$ Generation Partnership Project (3GPP), a system uses a total of 512 long pseudo-noise (PN) scrambling codes in order to identify base stations of a forward link, in which adjacent base stations use different long PN scrambling codes as scrambling codes of forward link channels. When a mobile station is turned on, the mobile station has to acquire system timing of a base station to which the mobile station belongs (i.e., a base station of which a reception signal has the maximum amplitude) and a long PN scrambling code ID used by the base station. This process is called a mobile station's cell search process.

In WCDMA, in order to facilitate the cell search process, the 512 long PN scrambling codes are grouped into 64 groups, and a primary sync channel and a secondary sync channel are included in the forward link. The primary sync channel is used for a mobile station to acquire slot sync, and the secondary sync channel is used for the mobile station to acquire a 10-msec frame boundary and long PN scrambling code group ID information.

The cell search process in WCDMA includes 3 steps. In the first step, a mobile station acquires slot sync using a primary scrambling code (PSC). In WCDMA, the same 15-slot PSC is transmitted every 10 msec, and PSCs transmitted by all base stations are the same signal. In the first step, slot sync is acquired using a matching filter suitable for the PSC.

In the second step, long PN scrambling code group ID information and a 10-msec frame boundary are acquired using the slot timing information acquired in the first step and a secondary scrambling code (SSC).

In the third step, a long PN scrambling code ID used by a currently connected base station is acquired using the 10-msec frame boundary and the long PN scrambling code group ID information that have been acquired in the second step and a common pilot channel code correlator. In other words, since 8 long PN scrambling codes are mapped to a single code group, the mobile station detects the long PN scrambling code ID used in the current cell by comparing outputs of the common pilot channel code correlator for 8 long PN scrambling codes.

In WCDMA, a sync channel consists of a primary sync channel and a secondary sync channel, and the primary sync channel, the secondary sync channel, a common pilot channel, and other data channels are multiplexed in a CDMA method based on a time domain direct sequence spread spectrum.

Recently, in the 3GPP, orthogonal frequency division multiplexing (OFDM)-based wireless transmission technology standardization is being established as a part of $3^{rd}$ Generation Long Term Evolution (3G-LTE) to compensate for disadvantages of WCDMA. The sync channel and common pilot channel structure and the mobile station's cell search process used in WCDMA are suitable for direct sequence code division multiple access (DS-CDMA) but cannot be applied to an OFDM forward link. Thus, a forward link sync channel and common pilot channel structure, a mobile station's initial cell search method, and an adjacent cell search method for handover are required in an OFDM cellular system.

DETAILED DESCRIPTION OF THE INVENTION

Technical Problem

Figure 1:
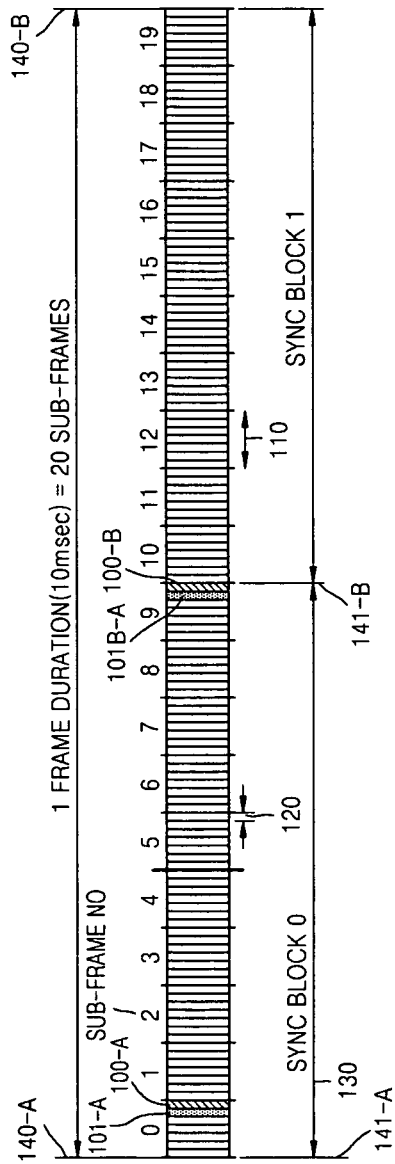
FIG. 1 illustrates a structure of a forward link frame according to an embodiment of the present invention.

The present invention provides a cell search apparatus and method including an initial cell search and adjacent cell search for handover in an orthogonal frequency division multiplexing (OFDM) cellular system.

The present invention also provides a forward link frame transmission apparatus and method for supporting the cell search method.

The present invention also provides an OFDM cellular system to which the cell search method is applied.

The present invention also provides a computer-readable recording medium having recorded thereon a program for executing the cell search method.

The present invention also provides a structure of a forward link frame used in the cell search method.

Technical Solution

To overcome the technical problems described previously, the present invention provides a cell search method using a forward synchronizing signal in a wireless communication system. The cell search method includes (a) acquiring sync block synchronization and a primary sync channel sequence number using a primary sync channel symbol included in a frame received by a terminal, (b) detecting a boundary of the frame and a scrambling code group using the sync block synchronization and a secondary sync channel symbol included in the frame received by the terminal, and (c) acquiring a scrambling code using the primary sync channel sequence number and the scrambling code group.

To overcome the technical problems described previously, the present invention also provides a method of transmitting a frame using a forward synchronizing signal by a base station included in a cell in a wireless communication system. The method includes (a) generating a primary sync channel sequence including sync block synchronization of the frame, a secondary sync channel sequence including a boundary of the frame and a scrambling code group of the cell, and a broadcast channel (BCH) including wireless communication system information and (b) generating a frame including each of a primary sync channel symbol and a secondary sync channel symbol that are code-hopped in a frequency domain using each of the generated sync channel sequences and the BCH and transmitting the generated frame.

Advantageous Effects

As described above, according to the present invention, in an OFDM cellular system, a cell search time of a mobile station can be reduced, and a cell search method can be implemented with low complexity.

In addition, synchronization can be acquired with low complexity by means of a synch signal transmission method according to the present invention.

Moreover, an adjacent cell search process can be efficiently performed using the synch signal transmission method according to the present invention, thereby smoothly performing handover and reducing battery power consumption of a mobile station.

Furthermore, by using the synch signal transmission method according to the present invention, OFDM symbol synchronization, a long scrambling code group ID, and a frame boundary can be detected and frequency offset estimation can be performed, with only one sync channel.

Best Mode

According to an aspect of the present invention, there is provided a cell search method using a forward sync signal in a wireless communication system. The cell search method includes (a) acquiring sync block synchronization and a primary sync channel sequence number using a primary sync channel symbol included in a frame received by a terminal, (b) detecting a boundary of the frame and a scrambling code group using the sync block synchronization and a secondary sync channel symbol included in the frame received by the terminal, and (c) acquiring a scrambling code using the primary sync channel sequence number and the scrambling code group.

(b) includes detecting the number of broadcast channels (BCHs) or detecting whether pilot hopping is used.

A cell search is resumed from (a) if a cyclic redundant code (CRC) error occurs and the cell search is completed if a CRC error does not occur.

(c) includes detecting a scrambling code having the maximum value of correlation values acquired by performing correlation on scrambling codes included in the scrambling code group with respect to a pilot channel of the frame.

(c) includes detecting a scrambling code having the maximum value of the correlation values acquired by performing correlation with respect to the pilot channel of the frame using a pilot hopping pattern that one-to-one corresponds to a scrambling code included in the scrambling code group if it is detected that pilot hopping is used in (b).

According to another aspect of the present invention, there is provided a method of transmitting a frame using a forward sync signal by a base station included in a cell in a wireless communication system. The method includes (a) generating a primary sync channel sequence including sync block synchronization of the frame, a secondary sync channel sequence including a boundary of the frame and a scrambling code group of the cell, and a broadcast channel (BCH) including wireless communication system information and (b) generating a frame including each of a primary sync channel symbol and a secondary sync channel symbol that are code-hopped in a frequency domain using each of the generated sync channel sequences and the BCH and transmitting the generated frame.

The frame is generated and transmitted such that the primary sync channel symbol and the secondary sync channel symbol are configured based on time division multiplexing (TDM) and are placed adjacent to each other.

The sync channel symbol and the BCH exist in the same sub-frame of the frame and the BCH is coherently demodulated by channel estimation using the secondary sync channel symbol.

The BCH included in the frame includes timing information, a bandwidth, and the number of transmission antennas of the wireless communication system and is demodulated using the boundary of the frame, the number of transmission antennas, and a scrambling code.

Mode for the Invention

Hereinafter, the present invention will be described more fully with reference to the accompanying drawings.

In general, each base station of an orthogonal frequency division multiplexing (OFDM) cellular system scrambles OFDM symbols using a long pseudo-noise (PN) scrambling code. However, since the base station can use another scrambling code instead of the long PN scrambling code, any code used to scramble OFDM symbols will hereinafter be referred to as a scrambling code for convenience of description.

Although each base station according to an embodiment of the present invention can achieve transmission diversity using a method of including a plurality of transmission antennas, a time switching transmit diversity (TSTD) method, a Precoding Vector Switching (PVS) Transmit Diversity (PVSTD) method, a frequency switching transmit diversity (FSTD) method, or other similar methods, it is assumed herein for convenience of description that each base station includes 2 transmission antennas.

While a mobile station according to an embodiment of the present invention can achieve reception diversity using a method of including a plurality of reception antennas or other similar methods, it is assumed herein for convenience of description that the mobile station includes 2 reception antennas. Such a mobile station has to combine data of data paths according to the reception diversity. A simple summing method is used herein as a data combining method, but it will be understood by those of ordinary skill in the art that the data combining method is not limited to the simple summing method.

The present invention relates to a method of performing a cell search including sync acquisition, frame boundary detection, and cell ID detection (also called scrambling code detection).

The term "sync acquisition" will be used herein as a comprehensive term for detection of a sync block boundary, and detection of a sync block means detection of OFDM symbol sync, a position of a primary sync channel in the sync block, and a position of a secondary sync channel in the sync block.

The term "frame boundary detection" will be used herein as a comprehensive term for detection of a frame boundary timing. The term "frame boundary information" will be used herein as a comprehensive term for information about frame boundary timing.

The term "scrambling code detection" will be used herein as a comprehensive term for scrambling code identifier detection and scrambling code detection, and the term "scrambling code information" will be used herein as a comprehensive term for a scrambling code identifier and a scrambling code.

In an OFDM-based long term evolution (LTE) system, a single base station Node-B is composed of several sector cells whereby base stations are identified by different random sequences and sectors in each of the base stations are identified by different orthogonal codes. Thus, the cells of the system are identified by synthetic code sequences generated by multiplying the random sequences by the orthogonal codes. Herein, the synthetic code will be referred to as a cell-unique "scrambling code".

The term "scrambling code group" will be used herein as a comprehensive term for a group of the scrambling codes used in the system. For example, when 513 scrambling codes are used in the system, they can be divided into 171 groups, each of which includes 3 scrambling codes.

The term "secondary sync channel sequence" will be used herein as a comprehensive term for a group of secondary sync channel "chips" mapped to subcarriers occupied by a secondary sync channel symbol in a frequency domain.

The term "primary sync channel sequence" will be used herein as a comprehensive term for a group of primary sync channel "chips" mapped to subcarriers occupied by a primary sync channel symbol in the frequency domain.

Herein, Fourier transform will be used as a comprehensive term for Discrete Fourier Transform (DFT) and Fast Fourier Transform (FFT).

FIG. 1 illustrates a structure of a forward link frame according to an embodiment of the present invention. Referring to FIG. 1, the forward link frame according to the current embodiment of the present invention has a 10-msec duration and includes 20 sub-frames 110.

In FIG. 1, the horizontal axis represents time and the vertical axis represents frequency (OFDM subcarrier).

Each of the 20 sub-frames 110 has a 0.5-msec length and includes 7 OFDM symbols 120. In an example illustrated in FIG. 1, a single primary sync channel OFDM symbol 100-A and a single secondary sync channel OFDM symbol 101-A exist at every 10 of the sub-frames 110, and thus a total of 2 primary sync channel symbols and a total of 2 secondary sync channel symbols exist within the forward link frame (10 msec).

In this case, a sync channel symbol repetition period 130 is the same as a length obtained by summing lengths of 10 of the sub-frames 110, and thus the number of sync channel symbol repetition periods 130 in the single forward link frame is 2. For convenience of description, the sync channel symbol repetition period 130 is referred to as a sync block 130.

In other words, FIG. 1 shows that the number of sync blocks 130 in a single forward link frame (10 msec) is 2. In this case, the length of each of the sync blocks 130 is 5 msec. When the primary sync channel OFDM symbol 100-A and the secondary sync channel OFDM symbol 101-A are combined based on Time Division Multiplexing (TDM) as in FIG. 1, the secondary sync channel OFDM symbol 101-A has to be placed adjacent to the primary sync channel OFDM symbol 100-A in order to use a channel estimation value of the primary sync channel OFDM symbol 100-A for coherent demodulation of the secondary sync channel OFDM symbol 101-A.

The OFDM symbols that remain after exclusion of the sync channel symbols are multiplied by cell-unique scrambling codes in the frequency domain in order to identify cells.

Figure 2:
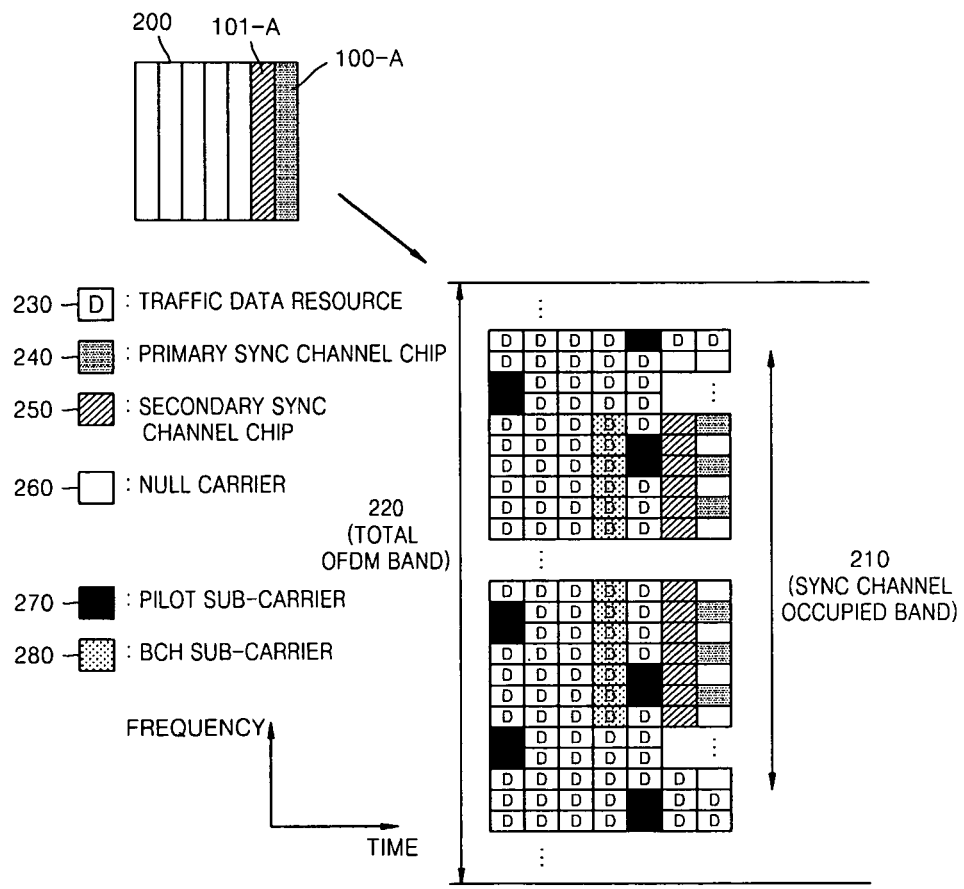
FIG. 2 illustrates a sub-frame containing a sync channel symbol according to an embodiment of the present invention.

FIG. 2 illustrates a sub-frame containing a sync channel symbol according to an embodiment of the present invention. For example, the sub-frame illustrated in FIG. 2 may be a sub-frame #0 of a first sync block 0 130 illustrated in FIG. 1.

Referring to FIG. 2, the sub-frame according to the current embodiment of the present invention includes an OFDM symbol duration 100-A in which a primary sync channel symbol is transmitted, the OFDM symbol duration 100-A including a traffic data sub-carrier 230, a primary sync channel sub-carrier 240, and a null carrier 260, and an OFDM symbol duration 101-A in which a secondary sync channel symbol is transmitted, the OFDM symbol duration 101-A including the traffic data sub-carrier 230 and a secondary sync channel sub-carrier 250.

Other OFDM symbols 200 include the traffic data sub-carrier 230 or a pilot sub-carrier 270. A position of the pilot sub-carrier 270 may be fixed or the pilot sub-carrier 270 may be frequency-hopped with a specific pattern for each cell.

As mentioned previously, the last two OFDM symbols in a sub-frame are a secondary sync channel symbol and a primary sync channel symbol. Broadcast Channel (BCH) symbols 280 may also be inserted into a sub-frame including a sync channel.

The BCH is a channel that transmits system information necessary to a mobile station, such as system timing information, a bandwidth used by a system, and the number of transmission antennas of a base station, to the mobile station in a cell.

As a method of assigning a sync channel occupied band, a sync channel can occupy a band which remains, by excluding a guard band or by occupying a portion of the remaining band.

An example of a system to which the latter method can be applied is a system which has to support a scalable bandwidth, such as a $3^{rd}$ generation long term evolution (3G-LTE) system.

In other words, a mobile station using only 1.25 MHz, a mobile station using only 2.5 MHz, and all mobile stations using 5 MHz, 10 MHz, 15 MHz, and 20 MHz can acquire synchronization with a base station system when each sync channel symbol occupies only a portion of a total system band 220. For example, when the system bandwidth is 10 MHz, only 1.25 MHz in the center, which remains due to the exclusion of a DC sub-carrier, is used.

As will be described later, a cell search apparatus of a mobile station performs filtering to pass only a sync channel occupied band 210, thereby improving cell search performance.

Referring to FIG. 2, a primary sync channel and a secondary sync channel occupy only a portion 210 of the total system band 220. As illustrated in FIG. 2, the primary sync channel may use only one of adjacent 2 sub-carriers without using the other one.

Alternatively, sub-carriers in the sync channel occupied band that remains by the exclusion of the guard band may be used. Herein, a method of using only one of adjacent 2 sub-carriers without using the other one will be taken as an example of a method for sub-carrier assignment of the primary sync channel symbol. In this case, the sub-carrier that is not used is assigned a predetermined number, e.g., '0', which is referred to as a null symbol.

When the latter method is used, a time domain signal (which will hereinafter be defined as a "sync channel symbol signal") of a sync channel symbol, which remains by the exclusion of a cyclic prefix, has a repetition pattern in the time domain.

Figure 3:
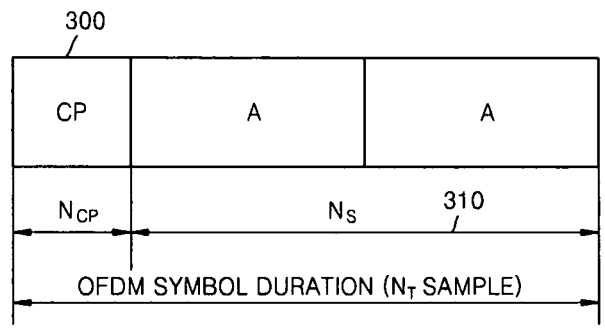
FIG. 3 is a conceptual diagram of a primary sync channel symbol in a time domain according to an embodiment of the present invention.

FIG. 3 is a conceptual diagram of a primary sync channel symbol in the time domain according to an embodiment of the present invention.

Figure 4:
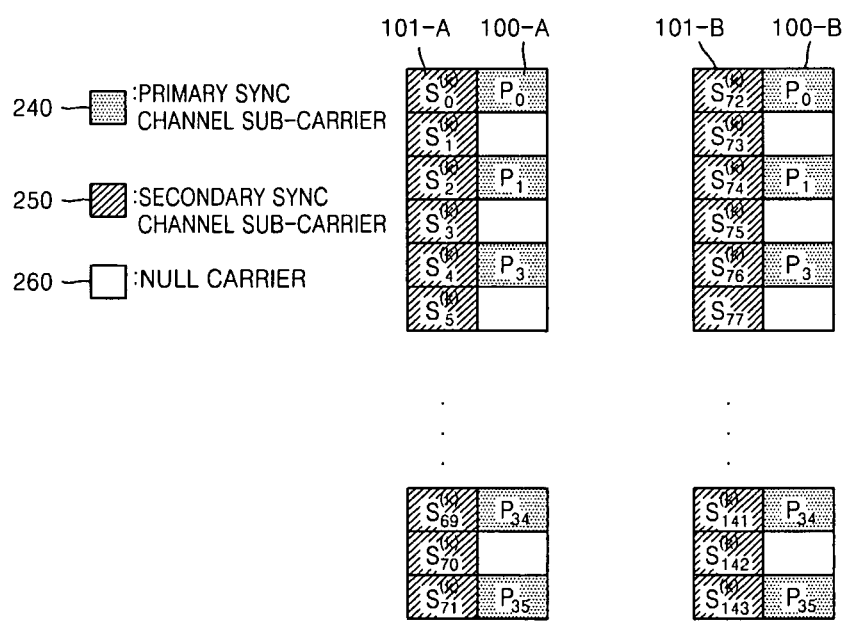
FIG. 4 illustrates a symbol mapped form of a sync channel sequence according to an embodiment of the present invention.

FIG. 4 illustrates a symbol mapped form of a sync channel sequence according to an embodiment of the present invention.

Referring to FIG. 3, $N_T$ indicates the number of samples of a total OFDM symbol duration, $N_{CP}$ indicates the number of samples of a cyclic prefix (CP) duration 300, and $N_S$ indicates the number of samples of a symbol duration 310 excluding the CP duration 300.

When a structure illustrated in FIG. 3 is used, a differential correlator may be used in a first step of a cell search process as will be described later.

In the case of a secondary sync channel, sub-carriers in the sync channel occupied band excluding the guard band, which remain due to the exclusion of the DC sub-carrier, may be used. For example, in 3G-LTE, a total sync channel occupied bandwidth is defined as 1.25 MHz, the number of total sub-carriers in the sync channel occupied band is 128, and 72 sub-carriers excluding the guard band and the DC sub-carrier can be used as sub-carriers assigned to the secondary sync channel.

In a forward link frame according to an embodiment of the present invention, a primary sync channel sequence and a secondary sync channel sequence assigned to a base station are mapped to sub-carriers of a primary sync channel symbol and a secondary sync channel symbol as illustrated in FIG. 4, whereby a component mapped to each sync channel sub-carrier is defined as a "chip".

The length of the primary sync channel sequence is the same as the number (36 in FIG. 4) of sub-carriers assigned to a single primary sync channel symbol and the primary sync channel sequence is repeated at every primary sync channel symbol duration. The length of the secondary sync channel sequence is the same as the number (144 in FIG. 4) of total frequency-domain sub-carriers assigned to a plurality of secondary sync channel symbols within a frame.

Eventually, a primary sync channel sequence period is the sync block 130 and a secondary sync channel sequence period is a single frame.

In other words, a primary sync channel sequence transmitted by a cell at every primary sync channel symbol can be expressed as follows:

$$P=(P_0,P_1,P_2,\ldots,P_{N^1-1}) \quad (1),$$

where each element of a primary sync channel sequence is defined as a "chip" of the primary sync channel sequence, and $N_1$ indicates the number of sub-carriers assigned to a primary sync channel symbol in a single primary sync channel symbol.

In the case of a primary sync channel, the same primary sync channel sequence is transmitted at every symbol.

By using the same primary sync channel sequence at every primary sync channel symbol, a receiver end can acquire a sync block boundary with a single correlator using a time-domain waveform of the primary sync channel sequence in the first step of the cell search process.

All cells used in a system basically use the same single sync channel sequence as a primary sync channel sequence but may also use a small number of sync channel sequences (e.g., 8 sync channel sequences or less).

Herein, it is assumed that the number of primary sync channel sequences used in the system is 1.

For the primary sync channel sequence, a random code sequence having a good correlation feature may be used, but a generalized chirp like (GCL) sequence may also be used.

A secondary sync channel sequence one-to-one corresponds to a scrambling code group.

The secondary sync channel sequence provides frame boundary information to a mobile station while one-to-one corresponding to a scrambling code group. That is, the mobile station acquiring the sync block boundary 141 using the primary sync channel detects a cell identifier using the secondary sync channel and at the same time, detects the frame boundary 141. To this end, the length of the secondary sync channel sequence is the same as the number (144 in FIG. 4) of total sub-carriers assigned to the secondary sync channel within a frame.

Eventually, the secondary sync channel sequence can be expressed as follows:

$$(S_0^{(k)},S_1^{(k)},S_2^{(k)},\ldots,S_{P\times N^2-1}^{(k)}) \quad (2)$$

In other words, $S_n^{(k)}$ indicates an nth chip of the secondary sync channel sequence having a sequence number (or a cell identifier number) k.

In Equation 1, P indicates the number (2 in FIGS. 1 and 4) of secondary sync channel symbols within a frame, and $N_2$ indicates the number of sub-carriers assigned to the secondary sync channel excluding a DC sub-carrier and sub-carriers for the guard band from the secondary sync channel symbols 101-A and 101-B and is 72 in FIG. 4. Eventually, the length of the secondary sync channel sequence is $P \times N_2$.

The same secondary sync channel sequence is transmitted at every frame for a signal transmitted by a base station device in a cell, and different sync channel sequences are used between cells.

In other words, a cell according to the present invention is assigned a secondary sync channel sequence mapped to a cell-unique identifier group, and each chip of the assigned second sync channel sequence is carried in each sub-carrier included in the sync channel occupied band.

Partial sequences for each secondary sync channel symbol of the secondary sync channel sequence, i.e., a partial sequence for a first secondary sync channel symbol in a frame in FIG. 4 and a partial sequence for a second secondary sync channel symbol can be expressed as $(S_0^{(k)}, S_1^{(k)}, S_2^{(k)}, \ldots, S_{N^2-1}^{(k)})$ and $(S_{N_2}^{(k)}, S_{N^2+1}^{(k)}, S_{N^2+2}^{(k)}, \ldots, S_{2N^2-1}^{(k)})$, respectively. These partial sequences are different from each other. Thus, even when a mobile station uses only one of P secondary sync channel symbols within a frame, frame boundary detection and cell identifier detection or scrambling code group detection become possible in a second step of the cell search process.

Partial sequences of the secondary sync channel sequence can be generated in various ways. As a first method, the partial sequences of the second sync channel sequence may be generated by multiplying a sequence having a length of $N_2$ by a modulation symbol value corresponding to a sync slot number.

That is, when a sequence having a length of $N_2$ is $(u_0^{(k)}, u_1^{(k)}, u_2^{(k)}, \ldots, u_{N^2-1}^{(k)})$, the former partial sequence $(S_0^{(k)}, S_1^{(k)}, S_2^{(k)}, \ldots, S_{N^2-1}^{(k)})$ becomes $(au_0^{(k)}, au_1^{(k)}, au_2^{(k)}, \ldots, au_{N^2-1}^{(k)})$ and the latter partial sequence $(S_{N_2}^{(k)}, S_{N^2+1}^{(k)}, S_{N^2+2}^{(k)}, \ldots, S_{2N^2-1}^{(k)})$ becomes $(bu_0^{(k)}, bu_1^{(k)}, bu_2^{(k)}, \ldots, bu_{N^2-1}^{(k)})$.

Herein, a indicates a modulation symbol value (e.g., 1 or (1+j)) corresponding to a first sync block and b indicates a modulation symbol value (e.g., −1 or (−1−j)) corresponding to a second sync block.

In this case, a receiver end of a mobile station performs coherent detection on the secondary sync channel using the channel estimation value using the primary sync channel, thereby acquiring a frame boundary only with a or b.

A method of generating and using a secondary sync channel sequence having a total length of $(2 \times N_2)$ by mapping a short sequence having a length of $N_2$ that is the number of sub-carriers assigned to a secondary sync channel symbol to a modulation symbol value corresponding to a sync block number in each secondary sync channel symbol domain is not outside the scope of the present invention.

In this case, when the number $N_G$ of scrambling code groups used in the system is 171, correlation may be performed on only 171 secondary sync channel sequences, each of which has a length of $N_2$ that is the number of sub-carriers assigned to a secondary sync channel symbol 101-A or 101-B, in the second step of the cell search process. For convenience of description, this method will be referred to as a secondary sync channel sequence assignment method 1.

As a second method of generating partial sequences of the secondary sync channel sequence, short sequences, each of which has a length of $N_2$ that is the number of sub-carriers assigned to a secondary sync channel symbol, are generated as many as $N_G \times 2$ as used in the system and the former $N_G$ sequences are mapped to the first secondary sync channel symbol 101-A and the latter $N_G$ sequences are mapped to the second secondary sync channel symbol 101-B.

In this case, in Equation 2, the former sequence $(S_0^{(k)}, S_1^{(k)}, S_2^{(k)}, \ldots, S_{N^2-1}^{(k)})$ becomes $(u_0^{(k)}, u_1^{(k)}, u_2^{(k)}, \ldots, u_{N^2-1}^{(k)})$ and the latter sequence $(S_{N_2}^{(k)}, S_{N^2+1}^{(k)}, S_{N^2+2}^{(k)}, \ldots, S_{2N^2-1}^{(k)})$ becomes $(w_0^{(k)}, w_1^{(k)}, w_2^{(k)}, \ldots, w_{N^2-1}^{(k)})$.

$(u_0^{(k)}, u_1^{(k)}, u_2^{(k)}, \ldots, u_{N^2-1}^{(k)})$ is a secondary sync channel sequence corresponding to a scrambling code group number k from among the former $N_G$ sequences out of the total $N_G \times 2$ sequences and $(w_0^{(k)}, w_1^{(k)}, w_2^{(k)}, \ldots, w_{N^2-1}^{(k)})$ is a sequence corresponding to a scrambling code group k from among the latter $N_G$ sequences out of the total $N_G \times 2$ sequences.

The number of correlators in the second step of the cell search process using the second method is two times that using the first method. For convenience of description, the second method will be referred to as a secondary sync channel sequence assignment method 2.

After cell search, a mobile station has to demodulate a BCH in order to acquire system information. When transmission diversity is applied to the BCH for frame error rate reduction, it is necessary to know the number of applied diversity antennas. In this case, frame boundary information and information about the number of antennas applied to the BCH may be simultaneously inserted into the secondary sync channel in various ways.

As a first method of simultaneously inserting the frame boundary information and the information about the number of applied antennas into the secondary sync channel, the information about the number of antennas applied to the BCH is modulated and then transmitted to the second sync channel sequence in the secondary sync channel sequence assignment method 2. In other words, a frame boundary is identified using different sequences at two sync channel symbol positions and is multiplied by modulation symbols including the antenna information.

That is, in this case, $(S_0^{(k)}, S_1^{(k)}, S_2^{(k)}, \ldots, S_{N^2-1}^{(k)})$ becomes $(cu_0^{(k)}, cu_1^{(k)}, cu_2^{(k)}, \ldots, cu_{N^2-1}^{(k)})$ and $(S_{N_2}^{(k)}, S_{N^2+1}^{(k)}, S_{N^2+2}^{(k)}, \ldots, S_{2N^2-1}^{(k)})$ becomes $(cw_0^{(k)}, cw_1^{(k)}, cw_2^{(k)}, \ldots, cw_{N^2-1}^{(k)})$ Herein, $(u_0^{(k)}, u_1^{(k)}, u_2^{(k)}, \ldots, u_{N^2-1}^{(k)})$ is a secondary sync channel sequence corresponding to a scrambling code group number k from among the former $N_G$ sequences out of the total $N_G \times 2$ sequences and $(w_0^{(k)}, w_1^{(k)}, w_2^{(k)}, \ldots, w_{N^2-1}^{(k)})$ is a sequence corresponding to the scrambling code group number k from among the latter $N_G$ sequences out of the total $N_G \times 2$ sequences.

c indicates a modulation symbol including information about the number of transmission antennas used in the BCH, e.g., a quadrature phase shift keying (QPSK) symbol. For example, the number of antennas applied to the BCH is 1 for a phase (1+j) of c, the number of applied antennas is 2 for a phase (−1−j) of c, and the number of applied antennas is 4 for a phase (1−j) of c.

A mobile station acquires a scrambling code group and a frame boundary and at the same time, demodulates the modulation symbol c including the BCH antenna information, thereby knowing the number of transmission diversity antennas used in the BCH. For convenience of description, this method will be referred to as a secondary sync channel sequence assignment method 3.

As a second method of simultaneously inserting the frame boundary information and the information about the number of applied antennas into the secondary sync channel, the two partial sequences $(S_0^{(k)}, S_1^{(k)}, S_2^{(k)}, \ldots, S_{N^2-1(k)})$ and $(S_{N_2}^{(k)}, S_{N^2+1}^{(k)}, S_{N^2+2}^{(k)}, \ldots, S_{2N^2-1}^{(k)})$ in Equation 2 become $(du_0^{(k)}, du_1^{(k)}, du_2^{(k)}, \ldots, du_{N^2-1}^{(k)})$ and $(eu_0^{(k)}, eu_1^{(k)}, eu_2^{(k)}, \ldots, eu_{N^2-1}^{(k)})$ for 1 transmission diversity antenna applied to the BCH, become $(fu_0^{(k)}, fu_1^{(k)}, fu_2^{(k)}, \ldots, fu_{N^2-1}^{(k)})$ and $(gu_0^{(k)}, gu_1^{(k)}, gu_2^{(k)}, \ldots, gu_{N^2-1}^{(k)})$ for 2 transmission diversity antennas applied to the BCH, and become $(dw_0^{(k)}, dw_1^{(k)}, dw_2^{(k)}, \ldots, dw_{N^2-1}^{(k)})$ and $(ew_0^{(k)}, ew_1^{(k)}, ew_2^{(k)}, \ldots, ew_{N^2-1}^{(k)})$ or $(dw_0^{(k)}, dw_1^{(k)}, dw_2^{(k)}, \ldots, dw_{N^2-1}^{(k)})$ and $(gw_0^{(k)}, gw_1^{(k)}, gw_2^{(k)}, \ldots, gw_{N^2-1}^{(k)})$ for 4 transmission diversity antennas applied to the BCH.

Herein, $(u_0^{(k)}, u_1^{(k)}, u_2^{(k)}, \ldots, u_{N^2-1}^{(k)})$ is a secondary sync channel sequence corresponding to a scrambling code group number k from among the former $N_G$ sequences out of the total $N_G \times 2$ sequences and $(w_0^{(k)}, w_1^{(k)}, w_2^{(k)}, \ldots, w_{N^2-1}^{(k)})$ is a sequence corresponding to the scrambling code group number k from among the latter $N_G$ sequences out of the total $N_G \times 2$ sequences. In other words, distinction between a case with 1 antenna applied to BCH transmission diversity or 2 antennas applied to BCH transmission diversity and a case with 4 antennas applied to BCH transmission diversity can be made using different sequences and distinction between the case with the 1 antenna applied to BCH transmission diversity and the case with the 2 antennas applied to BCH transmission diversity can be made using different modulation symbols whereby each modulation symbol contains information about a frame boundary.

The modulation symbols d, e, f, and g may use QPSK modulation and their phases may be, for example, (1+j), (1−j), (−1−j), and (−1+j). A mobile station can detect all of scrambling code group information, i.e., k, a frame boundary, and the number of antennas applied to the BCH, by means of coherent modulation of the secondary sync channel using the primary sync channel. For convenience of description, this method will be referred to as a secondary sync channel sequence assignment method 4.

As a third method of simultaneously inserting the frame boundary information and the information about the number of applied antennas into the secondary sync channel, the two partial sequences $(S_0^{(k)}, S_1^{(k)}, S_2^{(k)}, \ldots, S_{N^2-1}^{(k)})$ and $(S_{N^2}^{(k)}, S_{N^2+1}^{(k)}, S_{N^2+2}^{(k)}, \ldots, S_{2N^2-1}^{(k)})$ in Equation 2 become $(du_0^{(k)}, du_1^{(k)}, du_2^{(k)}, \ldots, du_{N^2-1}^{(k)})$ and $(eu_0^{(k)}, eu_1^{(k)}, eu_2^{(k)}, \ldots, eu_{N^2-1}^{(k)})$ for 1 transmission diversity antenna applied to the BCH or 2 transmission diversity antennas applied to the BCH, become $(dw_0^{(k)}, dw_1^{(k)}, dw_2^{(k)}, \ldots, dw_{N^2-1}^{(k)})$ and $(ew_0^{(k)}, ew_1^{(k)}, ew_2^{(k)}, \ldots, ew_{N^2-1}^{(k)})$ for 4 transmission diversity antennas applied to the BCH.

Herein, $(u_0^{(k)}, u_1^{(k)}, u_2^{(k)}, \ldots, u_{N^2-1}^{(k)})$ is a secondary sync channel sequence corresponding to a scrambling code group number k from among the former $N_G$ sequences out of the total $N_G \times 2$ sequences and $(w_0^{(k)}, w_1^{(k)}, w_2^{(k)}, \ldots, w_{N^2-1}^{(k)})$ is a sequence corresponding to the scrambling code group number k from among the latter $N_G$ sequences out of the total $N_G \times 2$ sequences.

In other words, distinction between a case with 1 antenna applied to BCH transmission diversity or 2 antennas applied to BCH transmission diversity and a case with 4 antennas applied to BCH transmission diversity can be made using different sequences and distinction between the case with the 1 antenna applied to BCH transmission diversity and the case with the 2 antennas applied to BCH transmission diversity is not separately made.

In this case, a mobile station first detects a scrambling code group, a frame boundary, and the number of antennas applied to BCH transmission diversity, and performs blind detection when the number of applied antennas is 1 or 2.

That is, the mobile station performs correlation between the total $N_G \times 2$ sequences. If the detected sequence belongs to the latter $N_G$ sequences, the mobile station knows that the number of antennas applied to the BCH is 4. In this case, the mobile station demodulates the BCH using a transmission diversity demodulation method corresponding to the 4 antennas. If the detected sequence belongs to the former $N_G$ sequences, the mobile station can know that the number of antennas applied to the BCH may be 1 or 2. In this case, the mobile station performs blind detection, i.e., demodulates the BCH two times, by assuming both the case with the 1 antenna and the case with the 2 antennas.

The modulation symbols d and e provide information about a frame boundary and may use binary phase shift keying (BPSK) modulation. For example, phases of the modulation symbols d and e may be 1 and −1 or (1+j) and (−1−j). The mobile station can detect the modulation symbols d and e by means of coherent demodulation of the secondary sync channel using the primary sync channel. For convenience of description, this method will be referred to as a secondary sync channel sequence assignment method 5.

As a fourth method of simultaneously inserting the frame boundary information and the information about the number of applied antennas into the secondary sync channel, the two partial sequences $(S_0^{(k)}, S_1^{(k)}, S_2^{(k)}, \ldots, S_{N^2-1}^{(k)})$ and $(S_{N^2}^{(k)}, S_{N^2+1}^{(k)}, S_{N^2+2}^{(k)}, \ldots, S_{2N^2-1}^{(k)})$ Equation 2 become $(du_0^{(k)}, du_1^{(k)}, du_2^{(k)}, \ldots, du_{N^2-1}^{(k)})$ and $(eu_0^{(k)}, eu_1^{(k)}, eu_2^{(k)}, \ldots, eu_{N^2-1}^{(k)})$ for 1 transmission diversity antenna applied to the BCH or 2 transmission diversity antennas applied to the BCH, become $(fw_0^{(k)}, fw_1^{(k)}, fw_2^{(k)}, \ldots, fw_{N^2-1}^{(k)})$ and $(gw_0^{(k)}, gw_1^{(k)}, gw_2^{(k)}, \ldots, gw_{N^2-1}^{(k)})$ for 4 transmission diversity antennas applied to the BCH.

In other words, distinction between a case with 1 antenna applied to BCH transmission diversity or 2 antennas applied to BCH transmission diversity and a case with 4 antennas applied to BCH transmission diversity can be made using secondary sync channel symbol modulation and distinction between the case with the 1 antenna applied to BCH transmission diversity and the case with the 2 antennas applied to BCH transmission diversity is not separately made.

In this case, a mobile station first detects a scrambling code group, a frame boundary, and the number of antennas applied to BCH transmission diversity, and performs blind detection when the number of applied antennas is 1 or 2. In this case, unlike the third method, the number of secondary sync channel correlators required is only $N_G$.

The modulation symbols d, e, f, and g provide information about a frame boundary and information about the antennas and may use QPSK modulation. For example, phases of the modulation symbols d, e, f, and g may be (1+j), (1−j), (−1−j), and (−1+j). The mobile station can detect the modulation symbols d, e, f, and g by means of coherent demodulation of the secondary sync channel using the primary sync channel.

For convenience of description, this method will be referred to as a secondary sync channel sequence assignment method 6.

In the secondary sync channel sequence assignment methods 1 through 6, a modulation symbol of the secondary sync channel sequence may include information about whether frequency hopping is used in a pilot symbol 270 used in a current cell.

The pilot symbol may be transmitted through the same sub-carrier at all times as illustrated in FIG. 2 or may be frequency-hopped with different hopping patterns for different cells in a way not to overlap with that of an adjacent cell. By means of pilot hopping, interference between the current cell and its adjacent cell becomes random, thereby improving channel estimation performance during data demodulation.

It is preferable that a mobile station knows whether the pilot symbol 270 is hopped during pilot correlation in a third step of the cell search process. If the mobile station does not know whether the pilot symbol 270 is hopped, the mobile station has to perform blind detection in the third step of the cell search process and in this case, the mobile station has to perform correlation two times more.

Therefore, if information about whether pilot hopping is used is carried in the secondary sync channel and the mobile station can know whether pilot hopping is used in the second step of the cell search process, the mobile station does not have to perform blind detection in the third step of the cell search process. When pilot hopping is applied for each cell, a pilot hopping pattern may one-to-one correspond to cell group information.

Thus, since the mobile station can know whether pilot hopping is used and further know a pilot hopping pattern if pilot hopping is performed in the second step of the cell search process, the mobile station uses such information for pilot correlation in the third step of the cell search process.

If the number of information bits that can be carried in the secondary sync channel exceeds information that can be carried in a secondary sync channel modulation symbol, some of the information bits are assigned to the secondary sync channel modulation symbol and the others are assigned to a secondary sync channel sequence number.

For example, when the secondary sync channel has to contain a total of 3 bits including 1-bit frame boundary information, 1-bit BCH antenna number information, and 1-bit pilot channel hopping information and is modulated by QPSK, 2 bits of the 3 bits are transmitted after being modulated by QPSK and the other 1 bit is transmitted using the secondary synch channel sequence number. In this case, the number of secondary sync channel sequences is two times the number of cell groups used in the system.

In this case, the mobile station has to previously know which bits among the 3 bits are assigned to the secondary sync channel modulation symbol and the secondary sync channel sequence. Thus, in the second step of the cell search process, the former 2 bits are detected by QPSK demodulation and the remaining 1 bit is detected using correlators whose number is 2 times the number of cell groups.

With respect to the forward link frame structure according to the present invention as illustrated in FIGS. 1 through 4, a cell search apparatus according to the present invention acquires a sync block boundary (a random one of 141-A and 141-B) using a differential correlator or a correlator using the time-domain waveform of the primary sync channel sequence in the first step of the cell search process and acquires a sync channel sequence number, i.e., a scrambling code group, and at the same time, 10-msec frame boundaries 140-A and 140-B using a secondary sync channel sequence correlator in the second step of the cell search process.

If information about transmission diversity antennas applied to the BCH is included in the secondary sync channel, the antenna information is also acquired in the second step of the cell search process. If information about whether pilot channel hopping is used is included in the secondary sync channel, the pilot hopping information may also be acquired.

In order to improve the performance of secondary sync channel correlation, coherent correlation may be performed using a channel estimation value that uses the primary sync channel. A detailed description thereof will be provided later.

The number of secondary sync channel sequences used in the system is equal to or less than the number of cell identifiers used in the system. If the number of secondary sync channel sequences used in the system is equal to the number of scrambling codes, the secondary sync channel sequence number one-to-one corresponds to the scrambling code number (or cell identifier).

If the number of secondary sync channel sequences used in the system is less than the number of scrambling codes, the secondary sync channel sequence number corresponds to the scrambling code group number. In this case, the third step of the cell search process is further required. In other words, frame boundary information, scrambling code group information, and pilot hopping information are acquired in the second step and one of possible scrambling code numbers in a group has to be found in the third step.

The third step is performed on a common pilot signal of a forward link using a parallel correlator in the frequency domain. Pilot correlation in the third step is performed using the pilot hopping information acquired in the second step.

Figure 5:
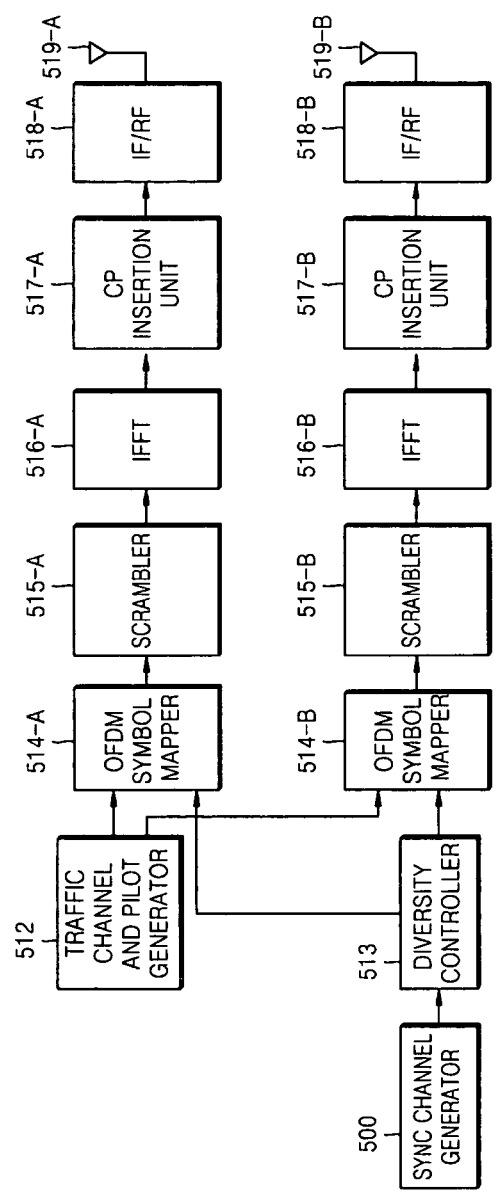
FIG. 5 is a block diagram of a base station according to an embodiment of the present invention.

FIG. 5 is a block diagram of a base station according to an embodiment of the present invention. Referring to FIG. 5, the base station according to the current embodiment of the present invention includes a sync channel generator 500, a traffic channel and pilot generator 512, a diversity controller 513, OFDM symbol mappers 514-A and 514-B, scramblers 515-A and 515-B, inverse Fourier transformers 516-A and 516-B, CP insertion units 517-A and 517-B, an Intermediate Frequency (IF)/Radio Frequency (RF) units 518-A and 518-B, and transmission antennas 519-A and 519-B.

The traffic channel and pilot channel generator 512 generates the traffic data sub-carrier 230 of FIG. 2, a BCH 280 of FIG. 2, or pilot data such as the pilot sub-carrier 270 of FIG. 2. The sync channel generator 500 generates a primary sync channel sequence, such as the primary sync channel sub-carrier 240, defined by Equation 1 and a secondary sync channel sequence, such as the secondary sync channel sub-carrier 250, defined by Equation 2 as illustrated in FIG. 2 or 4.

Each of the OFDM symbol mappers 514-A and 514-B maps data values of each channel to positions in the frequency/time domain as illustrated in FIG. 2.

Each of the scramblers 515-A and 515-B multiplies an output of each of the OFDM symbol mappers 514-A and 514-B, i.e., OFDM symbols excluding a sync channel symbol from the mapping result, by a base station's unique scrambling code in the frequency domain.

Each of the inverse Fourier transformers 516-A and 516-B generates a time-domain signal by performing an inverse Fourier transform on the output of each of the scramblers 515-A and 515-B.

Each of the CP insertion units 517-A and 517-B inserts a CP for enabling demodulation of an OFDM signal, even with a channel multi-path delay, into the output of each of the inverse Fourier transformers 406-A and 406-B.

Each of the IF/RF units 518-A and 518-B up-converts an output signal of each of the CP insertion units 517-A and 517-B, which is a baseband signal, to a band pass signal and amplifies the up-converted signal.

Each of the transmission antennas 519-A and 519-B transmits the amplified signal.

In FIG. 5, the number of transmission antennas 519-A and 519-B is 2. That is, if the base station according to an embodiment of the present invention has only one transmission antenna 519-A without the transmission antenna 519-B, the OFDM symbol mapper 514-B, the inverse Fourier transformer 516-B, the CP insertion unit 417-B, the IF/RF unit 418-B, and the diversity controller 513 may be omitted.

FIG. 5 illustrates a case where sync channel symbols are transmitted with transmission diversity using 2 transmission antennas at a transmitter end of the base station.

The transmission diversity using the diversity controller 513 illustrated in FIG. 5 will not be described. Sync channel symbols belonging to adjacent sync blocks are transmitted through different transmission antennas in order to achieve spatial diversity.

For example, a primary sync channel symbol and a second sync channel symbol belonging to a first sync block may be transmitted through the first transmission antenna 519-A, and a primary sync channel symbol and a second sync channel symbol belonging to a second sync block may be transmitted through the second transmission antenna 519-B.

This switching for achieving spatial diversity is performed by the diversity controller 513. That is, using a method of applying Time Switching Transmit Diversity (TSTD) to the sync channel, the diversity controller 513 provides an output of the sync channel generator 500 to the OFDM symbol mapper 514-A or 514-B by switching the output of the sync channel generator 500.

Besides the spatial diversity of the TSTD diversity, delay diversity can also be used as the transmission diversity.

Precoding vector switching is a method of setting precoding vectors for 2 transmission antennas as in Equation 3, transmitting the primary sync channel symbol and the secondary sync channel symbol belonging to the first sync block using a first preceding vector, and transmitting the primary sync channel symbol and the secondary sync channel symbol belonging to the second sync block using a second preceding vector.

$$w^0 = (w_0^0, w_1^0)$$

$$w^1 = (w_0^1, w_1^1) \qquad (3),$$

where a first element of a preceding vector is a weight value for a first antenna and a second element is a weight value for a second antenna.

When the preceding vector switching diversity is applied, the diversity controller 513 performs preceding vector switching and provides a result to the OFDM symbol mapper 514-A or 514-B.

The preceding vector switching may be performed in frame units. In other words, a method of multiplying a single frame by the same preceding vector and an adjacent frame by another preceding vector is not outside the scope of the present invention.

Equation 3 corresponds to an example in which the number of transmission antennas is 2 and the number of preceding vectors is 2. However, a modification of Equation 3 can be applied to a case where the number of transmission antennas is 2 and the number of preceding vectors is greater than 2 and a case where the number of transmission antennas is 4 and the number of preceding vectors is greater than 2.

Besides the TSTD and the preceding vector switching, Frequency Switching Transmit Diversity (FSTD) may also be used as the transmission diversity. In this case, a sequence element mapped to even-th sub-carriers out of sub-carriers assigned to the primary sync channel symbol is transmitted via the first antenna and a sequence element mapped to odd-th sub-carriers is transmitted via the second antenna. Similarly, a sequence element mapped to even-th sub-carriers out of sub-carriers assigned to the secondary sync channel symbol is transmitted via the first antenna and a sequence element mapped to odd-th sub-carriers is transmitted via the second antenna. Also in this case, the diversity controller performs this process.

If a BCH and a sync channel exist in the same sub-frame at all times and the same diversity is applied to the BCH and the sync channel, e.g., when the first preceding vector of Equation 3 is applied to both the BCH and the sync channel in the sub-frame #0 (sync block 0) illustrated in FIG. 1 and the second preceding vector is applied to both the BCH and the sync channel in the sub-frame #10 (sync block 1), channel estimation is performed using the secondary sync channel and then the channel estimation result may be used for coherent demodulation of the BCH.

In this case, the mobile station can perform coherent demodulation of the BCH even if the mobile station does not know the number of transmission diversity antennas applied to the BCH. Thus, it is not necessary to include information about the number of antennas applied to the BCH in the secondary sync channel.

Figure 6:
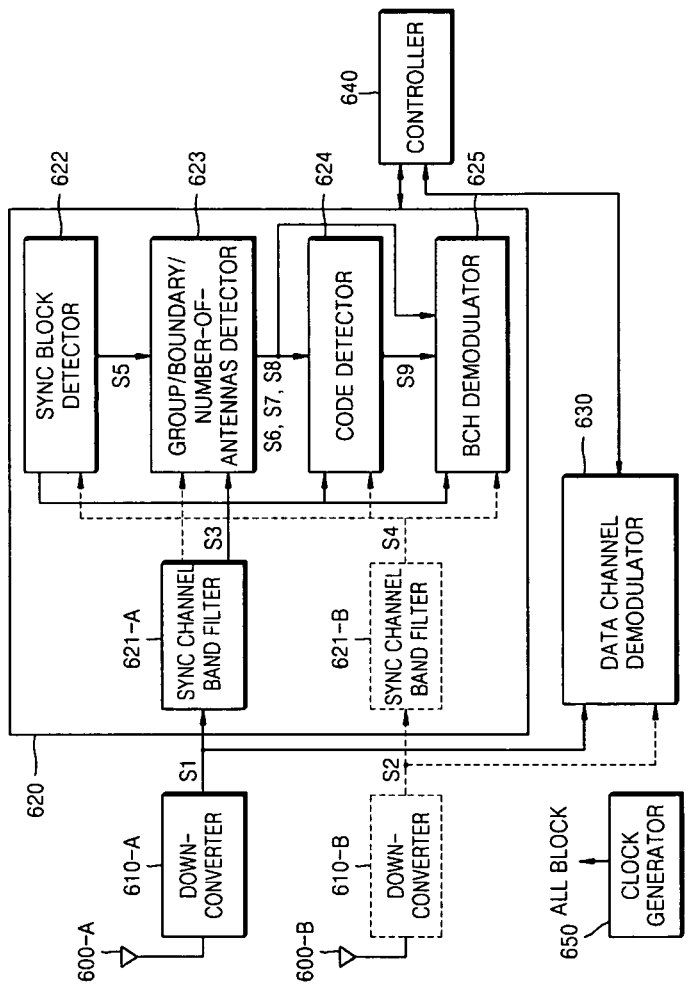
FIG. 6 is a block diagram of a receiver of a mobile station according to an embodiment of the present invention.

FIG. 6 is a block diagram of a receiver of a mobile station according to an embodiment of the present invention. The mobile station includes at least one reception antenna and FIG. 6 illustrates a case where the mobile station includes 2 reception antennas.

Referring to FIG. 6, the receiver of the mobile station according to the current embodiment of the present invention includes reception antennas 600-A and 600-B, down-converters 610-A and 610-B, a cell search unit 620, a data channel demodulator 630, a controller 640, and a clock generator 650.

RF signal type frames transmitted from base stations are received through the reception antennas 600-A and 600-B and converted to baseband signals S1 and S2 by the down-converters 610-A and 610-B.

The cell search unit 620 searches for a target cell using a sync channel symbol included in the down-converted signals S1 and S2. As a result of the cell search, sync channel symbol timing, a frame boundary, and a cell identifier of the target cell can be detected, and the target cell is, for example, searched for when the mobile station searches an initial cell at the first time or an adjacent cell, so as to allow handover to occur.

The controller 640 controls the cell search unit 620 and the data channel demodulator 630.

That is, the controller 640 controls timing and descrambling of the data channel demodulator 630 based on a cell search result acquired by controlling the cell search unit 620.

The data channel demodulator 630 demodulates traffic channel data, like the traffic data sub-carrier 230 of FIG. 2, included in the down-converted signals S1 and S2 under control of the controller 640. All the hardware in the mobile station operates by being synchronized with a clock generated by the clock generator 650.

Referring to FIG. 6, the cell search unit 620 includes sync channel band filters 621-A and 621-B, a sync block synchronization detector 622, a group/boundary/number-of-antennas detector 623, and a BCH demodulator 625.

The sync channel band filters 621-A and 621-B perform band pass filtering in order to pass only the sync channel occupied band 210 from among the entire OFDM signal band 220 as illustrated in FIG. 2, with respect to the down-converted signals S1 and S2.

The sync block synchronization detector 622 acquires sync information S5 using a primary sync channel symbol included in the filtered signals S3 and S4.

The group/boundary/number-of-antennas detector 623 detects a scrambling code group S6 and 10-msec frame timing information S7, and if necessary, the number S8 of transmission diversity antennas applied to the BCH using the acquired sync block timing information S5.

The group/boundary/number-of-antennas detector 623 can increase detection performance by performing frequency offset estimation and compensation before detecting the cell identifier and the frame timing.

The group/boundary/number-of-antennas detector 623 detects pilot hopping information if the pilot hopping information is inserted into a secondary sync channel.

The code detector 624 detects a scrambling code number (i.e., a cell identifier) by taking a maximum value after performing correlation of pilot data such as the pilot sub-carrier 270 of FIG. 2 using scrambling codes included in the scrambling code group S6 for a reception signal based on the scrambling code group S6, the frame boundary S7, and the number S8 of transmission antennas, acquired by the group/boundary/number-of-antennas detector 623.

If hopping is used in a pilot during secondary sync channel demodulation in the previous step, correlation is performed using a pilot hopping pattern that one-to-one corresponds to the cell group identifier detected in the second step. That is, in this case, a position of a pilot sub-carrier used for correlation is given by the hopping pattern.

The BCH demodulator 625 performs BCH demodulation using the frame boundary S7, the number S8 of transmission antennas, and pilot scrambling code information S9 in order to acquire system information and delivers the system information to the controller 640. Channel estimation for coherent demodulation of the BCH is performed using the pilot symbol 270 corresponding to the acquired number of antennas.

When the same diversity is applied to the BCH and the sync channel, coherent demodulation of the BCH can be performed using the secondary sync channel. Thus, the BCH may be directly demodulated without passing through the code detector. Since information of the BCH includes cell identifier information (i.e., scrambling code information used by the cell), and thus the code detector 624 can be omitted.

Figure 7:
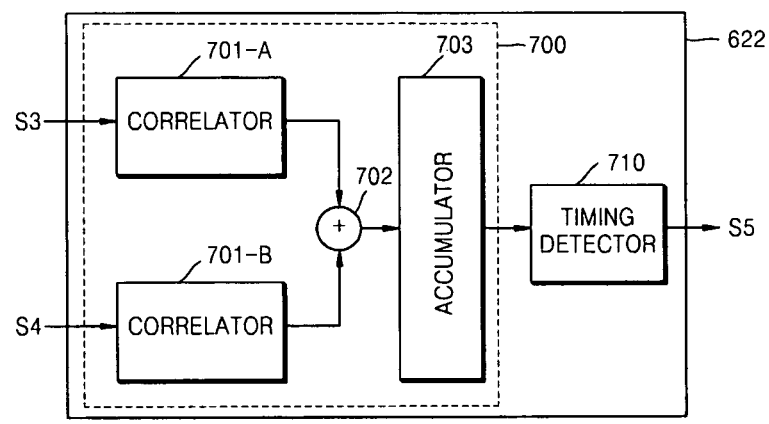
FIG. 7 is a block diagram of a sync block synchronization detector illustrated in FIG. 6, according to an embodiment of the present invention.

FIG. 7 is a block diagram of the sync block synchronization detector 622 illustrated in FIG. 6 according to an embodiment of the present invention. Referring to FIG. 7, the sync block synchronization detector 622 according to the current embodiment of the present invention includes differential correlators 701-A and 701-B, a signal combiner 702, an accumulator 703, and a timing determiner 710.

In FIG. 7, when it is assumed that sync channel symbols use even-th or odd-th subcarriers from among subcarriers belonging to the sync channel occupied band 210 illustrated in FIG. 2, the sync block synchronization detector 622 may be configured as a differential correlator using the repetition pattern illustrated in FIG. 3 or may be implemented as a matched filter type in which the receiver of the mobile station previously stores a time domain waveform of the primary sync channel sequence expressed as Equation 1 and performs correlation in the time domain.

Outputs of the differential correlators 701-A and 701-B are accumulated in the accumulator 703 after passing through the signal combiner 702.

Referring to the frame structure illustrated in FIG. 1, 9600 outputs of the correlators 701-A and 701-B are generated per sync block length and the timing determiner 710 detects a position of a sample which generates a peak value among these correlation values and determines the detected sample position as primary sync channel symbol timing.

However, the sync block synchronization detector 622 according to the current embodiment of the present invention may further include the accumulator 703 as illustrated in FIG. 7 in order to improve symbol sync detection performance.

The accumulator 703 combines each of the 9600 correlation values for each sample position with each correlation value for a sample separated by every sync block length from each sample position.

When the sync block detector 622 includes the accumulator 703, the timing determiner 710 detects a maximum value from among the 9600 values stored in the accumulator 703 and outputs a sample position of the detected maximum value as the detected timing information S5.

Figure 8:
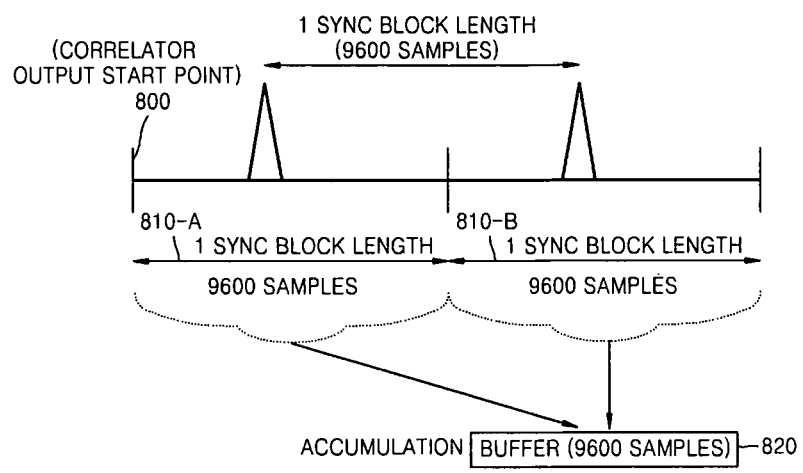
FIG. 8 is a graph illustrating correlation values calculated by a correlator illustrated in FIG. 7 based on sample positions, according to an embodiment of the present invention.

FIG. 8 is a graph illustrating correlation values calculated by the correlator illustrated in FIG. 7 based on sample positions according to an embodiment of the present invention.

It is assumed that the differential correlation values are obtained in an ideal channel environment in which fading or noise does not exist in a channel between a transmitter end of a base station and the receiver end of a mobile station.

Referring to FIG. 8, the horizontal axis represents time or a sample index, and the vertical axis represents a differential correlation value at each position of the horizontal axis.

Reference numeral 800 indicates a position of a first sample for which the correlator performs correlation.

The correlator 701-A or 701-B calculates final 9600 correlation values by obtaining a correlation value from the first sample position and provides the calculated 9600 correlation values to the accumulator 703. Thereafter, the correlator 701-A or 701-B calculates 9600 correlation values from a position of a sample next to a sample for which the correlator 701-A or 701-B performed the last correlation and provides the calculated 9600 correlation values to the accumulator 703. The correlator 701-A or 701-B repeats this process.

Among all the M samples, a position at which a peak occurs exists as illustrated in FIG. 8 as a result of the repetition pattern of sync channel symbols.

Figure 9:
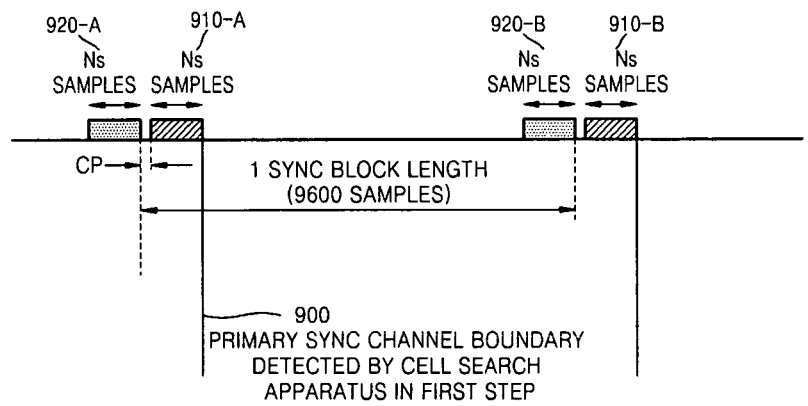
FIG. 9 illustrates a structure of an input signal provided to a group/boundary/number-of-antennas detector illustrated in FIG. 6 based on a sync block timing acquired by the sync block synchronization detector illustrated in FIG. 6, according to an embodiment of the present invention.

FIG. 9 illustrates a structure of an input signal provided to the group/boundary/number-of-antennas detector 623 illustrated in FIG. 6 based on a sync block timing acquired by the sync block synchronization detector 622 illustrated in FIG. 6, according to an embodiment of the present invention.

A CP of a portion corresponding to a primary sync channel symbol and a CP of a portion corresponding to a secondary sync channel symbol are removed based on the sync channel symbol timing 900 acquired by the sync block synchronization detector 622, and thereby, sample values corresponding to a primary sync channel position and a secondary sync channel position estimated for each sync block are input to the group/boundary/number-of-antennas detector 623.

Referring to FIG. 9, reference numerals 910-A and 910-B indicate positions of primary sync channel symbols, which are obtained using the acquired the sync channel symbol timing 900, and reference numerals 920-A and 920-B indicate positions of secondary sync channel symbols, which are obtained using the acquired the sync channel symbol timing 900.

Sample values of a primary sync channel are used for coherent correlation of a secondary sync channel as will be described later.

Figure 10:
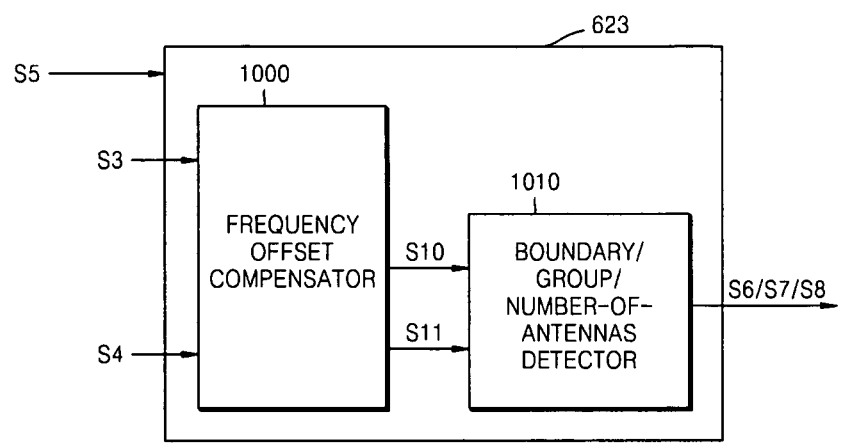
FIG. 10 is a block diagram of the group/boundary/number-of-antennas detector illustrated in FIG. 7, according to an embodiment of the present invention.

FIG. 10 is a block diagram of the group/boundary/number-of-antennas detector 623 illustrated in FIG. 7, according to an embodiment of the present invention. Referring to FIG. 10, the group/boundary/number-of-antennas detector 623 according to the current embodiment of the present invention includes a frequency offset compensator 1000 and a boundary/group/number-of antennas detector 1010.

The frequency offset compensator 1000 sets the sync channel symbol timing 900 based on the output S5 of the sync block synchronization detector 622, stores $2 \times N_S$ received samples (621-A and 621-B) at primary sync channel estimated positions, which are provided from each of the sync channel band filters 621-A and 621-B over several sync block durations based on the sync channel symbol timing 900, estimates a frequency offset using the $2 \times N_S$ received samples, compensates for frequency offsets of the $4 \times N_S$ received samples (910-A, 920-A, 910-B, and 920-B) based on the estimated frequency offset, and provides the compensated $4 \times N_s$ received signal samples to the boundary/group/number-of antennas detector 1010.

The boundary/group/number-of antennas detector 1010 detects a scrambling code group identifier, a 10-msec frame timing, and the number of BCH antennas, or pilot hopping information using the frequency offset compensated samples S10 and S11 and provides the detected information to the control block.

The boundary/group/number-of antennas detector 1010 performs a Fourier transform on $N_S$ received sample values for every sync channel symbol position (910-A, 920-A, 910-B, and 920-B) for conversion into a frequency-domain signal, performs correlation on all possible secondary sync channel sequences, and demodulates a demodulation symbol included in the secondary sync channel, thereby acquiring a frame timing and if necessary BCH antenna number information as well as a scrambling code group of the target cell.

The primary sync channel components 910-A and 910-B are used for channel estimation for coherent correlation of the secondary sync channel sequence. When information about whether pilot hopping is used is carried in the secondary sync channel, the boundary/group/number-of antennas detector 1010 also detects whether pilot hopping is used.

Figure 11:
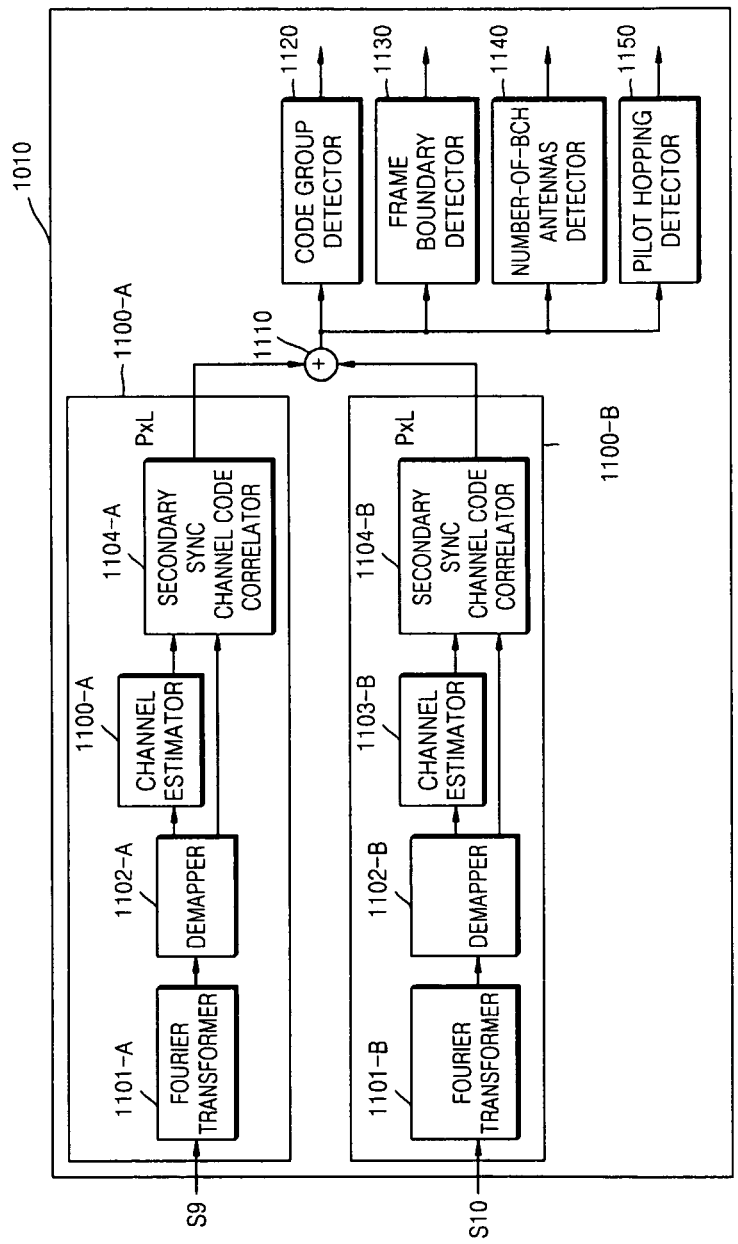
FIG. 11 is a block diagram of the group/boundary/number-of-antennas detector illustrated in FIG. 10, according to an embodiment of the present invention.

FIG. 11 is a block diagram of the group/boundary/number-of-antennas detector 1010 illustrated in FIG. 10, according to an embodiment of the present invention. Referring to FIG. 11, the group/boundary/number-of-antennas detector 1010 according to the current embodiment of the present invention includes code correlation calculators 1100-A and 1100-B, a combiner 1110, a code group detector 1120, a frame boundary detector 1130, and a number-of-BCH antenna detector 1140.

When the secondary sync channel includes information about whether frequency hopping is used for a pilot, a pilot hopping detector 1150 may be further included in order to detect whether frequency hopping is used.

The code correlation calculators 1100-A and 1100-B perform Fourier conversion on sync channel symbols S10 and S11 that are frequency offset compensated by the frequency offset compensator 1000 in order to convert them into frequency-domain signals, and calculates all correlation values for all possible secondary sync channel sequences (the number of secondary sync channel sequences used in the system is $N_G$ or $2N_G$).

The primary sync channel components 910-A and 910-B are used in channel estimation for coherent correlation of the secondary sync channel sequence.

The combiner 1110 combines outputs of the code correlation calculators 1100-A and 1100-B and provides the combined outputs to the code group detector 1120, the frame boundary detector 1130, and the number-of-BCH antenna detector 1140.

The code group detector 1120 detects a code group corresponding to a secondary sync channel sequence having the maximum value among the code correlation outputs.

The frame boundary detector 1130 detects a frame boundary using a value corresponding to a maximum value correlation among the code correlation outputs.

More specifically, when the secondary sync channel sequence assignment method 1 according to the present invention is used in the transmitter end, on the assumption that 1 is used as a secondary sync channel modulation symbol for the first sync block and −1 is used as a secondary sync channel modulation symbol for the second sync block, the frame boundary detector 1130 regards the currently detected sync channel position as belonging to the first sync block if the maximum value of the correlation values is a positive value and regards the currently detected sync channel position as belonging to the second sync block if the maximum value of the correlation values is a negative value, thereby acquiring a frame boundary.

When the secondary sync channel sequence assignment method 2 according to the present invention is used in the transmitter end, the frame boundary detector 1130 regards the acquired sync channel symbol as being located in the first sync block if a number of the secondary sync channel sequence corresponding to the maximum value from among the code correlation outputs is one of the former $N_G$ sequences of a total of $2N_G$ sequences and regards the acquired sync channel symbol as being located in the second sync block if the secondary sync channel sequence number is one of the latter $N_G$ sequences, thereby acquiring a frame boundary.

When one of the secondary sync channel sequence assignment methods 3, 4, 5, and 6 according to the present invention is used, the frame boundary is acquired in a similar way to that in the secondary sync channel sequence assignment method 1 or 2.

The number-of-BCH antenna detector 1140 detects the number of BCH antennas using a value corresponding to the maximum value of the correlation values from among the code correlation outputs. More specifically, the number-of-BCH antenna detector 1140 determines the number of antennas applied to the BCH as 1 when a phase of the maximum value of the correlation values is closest to (1+j), as 2 when the phase is closest to (−1−j), and as 4 when the phase is closest to (1−j).

For the secondary sync channel sequence assignment methods 4, 5, and 6, a similar method is used to acquire number-of-BCH antenna information. For the secondary sync channel sequence assignment methods 1 and 2, the number-of-BCH antenna detector 1140 does not need to operate.

The pilot hopping detector 1150 detects whether frequency hopping is used for a pilot if the secondary sync channel includes information about whether frequency hopping is used for the pilot.

Referring to FIG. 11, the code correlation calculators 1100-A and 1100-B include Fourier transformers 1101-A and 1101-B, demappers 1102-A and 1102-B, channel estimators 1103-A and 1103-B, and code correlators 1104-A and 1104-B, respectively.

The Fourier transformers 1101-A and 1101-B perform a Fourier transform on time-domain samples 910-A, 920-a, 910-B, and 920-B corresponding to each sync channel symbol domain in order to acquire $N_S$ frequency domain converted values for each symbol. The demappers 1102-A and 1102-B acquire $N_1$ values (see FIG. 4) corresponding to sub-carriers of the primary sync channel sequence from among the acquired total frequency converted values and $N_2$ values (see FIG. 4) corresponding to sub-carriers of the secondary sync channel sequence.

The channel estimators 1103-A and 1103-B perform channel estimation on each sub-carrier from the $N_1$ primary sync channel frequency domain received sample values received from the demappers 1102-A and 1102-B using a previously stored primary sync channel sequence expressed as Equation 1.

The secondary sync channel code correlators 1104-A and 1104-B perform mutual correlation on the $N_2$ secondary sync channel frequency domain received sample values received from the demappers 1102-A and 1102-B and possible $N_G$ or $2N_G$ secondary sync channel sequences.

At this time, the mutual correlation is performed by compensating for channel distortion for each sub-carrier using channel estimation values received from the channel estimators 1103-A and 1103-B.

Figure 12:
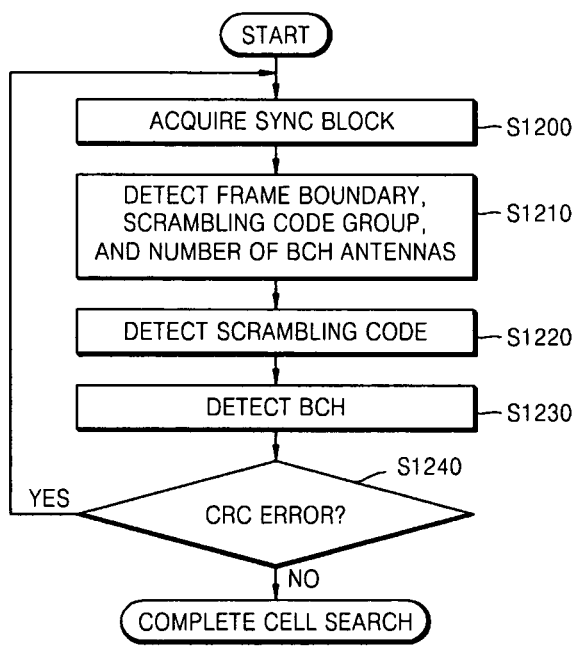
FIG. 12 is a flowchart illustrating a cell search method of a mobile station, according to an embodiment of the present invention.

FIG. 12 is a flowchart illustrating a cell search method of a mobile station, according to an embodiment of the present invention.

Referring to FIG. 12, the first step (S1200) comprises an operation of acquiring sync block synchronization, and the second step (S1210) comprises an operation of detecting a frame boundary, a scrambling code group, and the number of BCH antennas or information about whether pilot hopping is used, including frequency offset compensation. The third step (S1220) comprises an operation of detecting a scrambling code in a group based on the information acquired in the second step, by using the pilot symbol 191.

The fourth step (S1240) comprises an operation of performing coherent demodulation on the BCH using the scrambling code acquired in the third step. If a cyclic redundant code (CRC) error occurs, the cell search method goes back to the first step. If a CRC error does not occur, the cell search is completed.

Figure 13:
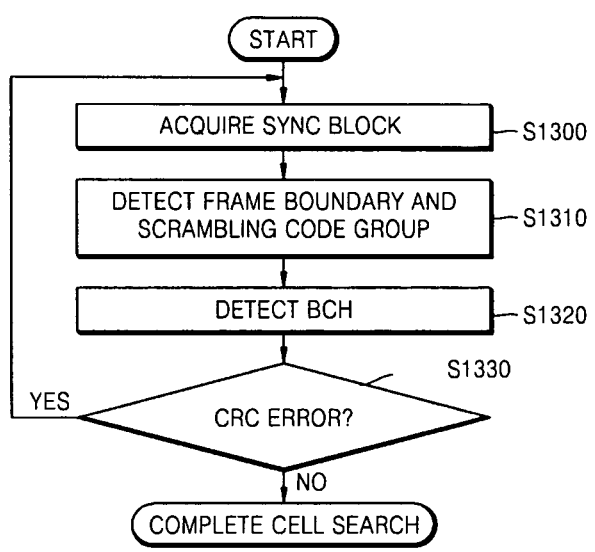
FIG. 13 is a flowchart illustrating a cell search method of a mobile station, according to another embodiment of the present invention.

FIG. 13 is a flowchart illustrating a cell search method of a mobile station, according to another embodiment of the present invention.

Referring to FIG. 13, the first step (S1300) comprises an operation of acquiring a sync block, the second step (S1310) comprises an operation of detecting a frame boundary and a scrambling code group, including frequency offset compensation, and the third step (S1320) comprises an operation of performing coherent demodulation on the BCH using channel estimation of the secondary sync channel based on the information acquired in the second step.

If a CRC error occurs, the cell search method goes back to the first step. If a CRC error does not occur, the cell search is completed.

The present invention can also be embodied as a computer-readable code on a computer-readable recording medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks and optical data storage devices. The computer-readable recording medium can also be distributed over network coupled computer systems so that the computer-readable code is stored and executed in a distributed fashion. Also, functional programs, codes, and code segments for implementing the present invention can be easily construed by those of ordinary skill in the art.

The present invention has been particularly shown and described with reference to exemplary embodiments thereof. Terms used herein are only intended to describe the present invention and are not intended to limit any meaning or the scope of the present invention claimed in the claims. Therefore, it will be understood by those of ordinary skill in the art that various changes in form and details may be made therein without departing from the spirit and scope of the present invention as defined by the following claims. Accordingly, the scope of the present invention will be defined by the appended claims, and differences within the scope should be construed to be included in the present invention.

The invention claimed is:

1. A method of searching a cell in a mobile station of a wireless communication system, the method comprising:
   receiving a frame including a first and a second primary synchronization channel (PSCH) and a first and a second secondary synchronization channel (SSCH); and
   extracting a cell group identifier to which the mobile station belongs using at least one of a first code sequence in the first SSCH and a second code sequence in the second SSCH,
   wherein the first code sequence is different from the second code sequence,
   the wireless communication system uses $N_G \times 2$ sequences for SSCH which are classified into former $N_G$ sequences and latter $N_G$ sequences,
   the first code sequence from the former $N_G$ sequences corresponds to the cell group identifier, and the second code sequence from the latter $N_G$ sequences corresponds to the cell group identifier, and
   the first PSCH and the first SSCH are formed based on time division multiplexing and placed just adjacent to each other in the frame, and the second PSCH and the second SSCH are formed based on time division multiplexing and placed just adjacent to each other in the frame.

2. The method of claim 1, wherein a primary synchronization channel sequence is repeatedly arranged in the first and the second PSCH.

3. The method of claim 2, wherein the wireless communication system uses a plurality of primary synchronization channel sequences.

4. The method of claim 1, further comprising extracting frame boundary information using at least one of the first code sequence and the second code sequence.

5. The method of claim 1, wherein the first and the second code sequence convey information about a number of antennas applied to broadcasting channel (BCH).

6. A mobile station that operates in a wireless communication system, the mobile station comprising:
   a receiver configured to receive a frame including a first and a second primary synchronization channel (PSCH) and a first and a second secondary synchronization channel (SSCH); and
   a cell search unit configured to extract a cell group identifier to which the mobile station belongs using at least one of a first code sequence in the first SSCH and a second code sequence in the second SSCH,
   wherein the first code sequence is different from the second code sequence,
   the wireless communication system uses $N_G \times 2$ sequences for SSCH which are classified into former $N_G$ sequences and latter $N_G$ sequences,
   the first code sequence from the former $N_G$ sequences corresponds to the cell group identifier, and the second code sequence from the latter $N_G$ sequences corresponds to the cell group identifier, and
   the first PSCH and the first SSCH are formed based on time division multiplexing and placed just adjacent to each other in the frame, and the second PSCH and the second SSCH are formed based on time division multiplexing and placed just adjacent to each other in the frame.

7. The mobile station of claim 6, wherein a primary synchronization channel sequence is repeatedly arranged in the first and the second PSCH.

8. The mobile station of claim 7, wherein the wireless communication system uses a plurality of primary synchronization channel sequences.

9. The mobile station of claim 6, wherein a cell search unit further configured to extract frame boundary information using at least one of the first code sequence and the second code sequence.

10. The mobile station of claim 6, wherein the first and the second code sequence convey information about a number of antennas applied to broadcasting channel (BCH).

11. A method of transmitting a frame in a base station of a wireless communication system, the method comprising:
   generating a frame including a first and a second primary synchronization channel (PSCH) and a first and second secondary synchronization channel (SSCH); and
   transmitting the frame to a mobile station,
   wherein the wireless communication system uses $N_G \times 2$ sequences for SSCH which are classified into former $N_G$ sequences and latter $N_G$ sequences,
   a first code sequence in the first SSCH from the former $N_G$ sequences corresponds to a cell group identifier, and a second code sequence in the second SSCH from the latter $N_G$ sequences corresponds to the cell group identifier, and the first PSCH and the first SSCH are formed based on time division multiplexing and placed just adjacent to each other in the frame, and the second PSCH and the second SSCH are formed based on time division multiplexing and placed just adjacent to each other in the frame.

12. The method of claim 11, wherein a primary synchronization channel sequence is repeatedly arranged in the first and the second PSCH.

13. The method of claim 12, wherein the wireless communication system uses a plurality of primary synchronization channel sequences.

14. The method of claim 11, wherein at least one of the first code sequence and the second code sequence convey frame boundary information.

15. The method of claim 11, wherein the first and the second code sequence convey information about a number of antennas applied to broadcasting channel (BCH).

16. A base station that operates in a wireless communication, the base station comprising:
a generator configured to generate a frame including a first and a second primary synchronization channel (PSCH) and a first and a second secondary synchronization channel (SSCH); and
a transmitter configured to transmit the frame to a mobile station,
wherein the wireless communication system uses $N_G \times 2$ sequences for SSCH which are classified into former $N_G$ sequences and latter $N_G$ sequences,
a first code sequence in the first SSCH from the former $N_G$ sequences corresponds to a cell group identifier, and a second code sequence in the second SSCH from the latter $N_G$ sequences corresponds to the cell group identifier, and
the first PSCH and the first SSCH are formed based on time division multiplexing and placed just adjacent to each other in the frame, and the second PSCH and the second SSCH are formed based on time division multiplexing and placed just adjacent to each other in the frame.

17. The base station of claim 16, wherein a primary synchronization channel sequence is repeatedly arranged in the first and second PSCHs.

18. The base station of claim 17, wherein the wireless communication system uses a plurality of primary synchronization channel sequences.

19. The base station of claim 16, wherein at least one of the first code sequence and the second code sequence convey frame boundary information.

20. The base station of claim 16, wherein the first and the second code sequence convey information about a number of antennas applied to broadcasting channel (BCH).

* * * * *